United States Patent Office 3,028,428
Patented Apr. 3, 1962

3,028,428
THERAPEUTICALLY ACTIVE BENZHYDRYL ETHERS
Cornelis van der Stelt, Amsterdam, Netherlands, assignor to N.V. Koninklijke Pharmaceutische Fabrieken v/h Brocades-Stheeman & Pharmacia, Meppel, Netherlands, a corporation of the Netherlands
No Drawing. Filed Oct. 21, 1958, Ser. No. 768,576
Claims priority, application Netherlands Oct. 22, 1957
1 Claim. (Cl. 260—570)

This invention relates to a process for the production of therapeutically active compounds. This process is characterized in that substances having the general formula

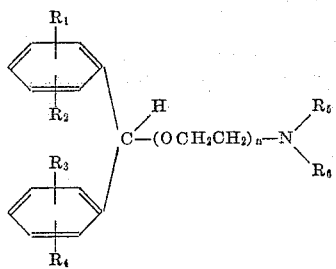

or the salts thereof, in which $R_1$, $R_2$, $R_3$ and $R_4$=hydrogen atoms or lower alkyl groups having at most 6 carbon atoms, $R_5$ and $R_6$=alkyl groups with at most 3 carbon atoms and $n$=an integer between 2 and 10, on the understanding that if $n=2$ at least one of the symbols $R_1$, $R_2$, $R_3$ and $R_4$ represents an alkyl group is synthetized in the manner known per se for the production of analogous compounds.

The compounds coming under the above general formula are new substances. They are preferably prepared with one or more alkyl groups in the ortho position, but the invention is not limited thereto.

From the subjoined table in which the known antihistaminic diphenhydramine is used as a comparative substance whose activity has arbitrarily been taken=1, it follows that the compounds according to the invention have no particular value as spasmolytics and that their anti-histaminic activity is very small. On the other hand it appears that the compounds are excellently suited for subduing coughing stimuli whereas they also exhibit activity as local anaesthetics particularly as surface anaesthetics.

It is possible to subdue coughing stimuli by the use of centrally effective compounds, such as codeine. These, however, have the drawback that they have a depressive influence on the respiration or may cause nausea.

The compounds according to the invention which are closely related to the compounds according to Dutch Patents 84,468 and 85,452 (among which latter there are various substances which are peripherally effective) do not have the above drawbacks.

Pharmacological tests on cats which under Numalnarcosis were intratracheally agitated with soap powder have shown that the therapeutic range of various of the compounds according to the invention is comparable with or even better than that of the compound Benzononatine known as a coughing cure and having the formula

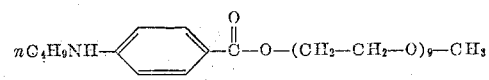

In the subjoined table, in which as a comparative basis the degree of pectoral activity was taken which at an average was obtained with 1 mg./kg. Benzononatine the therapeutic range of various of the compounds according to the invention and the appurtenant toxicity is mentioned. In this test the substances were intravenously injected.

TABLE II

| | $R_1$ | $R_2$ | $R_3$ | $R_4$ | $R_5$ | $R_6$ | $n$ | HX | Dose in mg./kg. | $LD_{50}$ intravenous in mg./kg. | Therapeutic range |
|---|---|---|---|---|---|---|---|---|---|---|---|
| A | 2-$CH_3$ | 6-$CH_3$ | 2'-$CH_3$ | 6'-$CH_3$ | $CH_3$ | $CH_3$ | 2 | HCl | 1 | 20–25 | 20–25 |
| B | H | H | H | H | $CH_3$ | $CH_3$ | 2 | HCl | 8 | 30–40 | 5 |
| C | 4-$CH_3$ | H | H | H | $CH_3$ | $CH_3$ | 2 | HCl | 6 | 30–35 | 5.5 |
| D | 2-t.butyl | H | H | H | $CH_3$ | $CH_3$ | 2 | HCl | 8 | 20–25 | 3 |
| E | 2-$CH_3$ | H | H | H | $CH_3$ | $CH_3$ | 2 | HCl | 8 | 30–35 | 4 |
| F | 2-$CH_3$ | H | 2'-$CH_3$ | H | $CH_3$ | $CH_3$ | 2 | HCl | 8 | 25–30 | 3.5 |
| G | 2-$CH_3$ | 6-$CH_3$ | H | H | $CH_3$ | $CH_3$ | 2 | HCl | 8 | 25–30 | 3.5 |
| H | 2-$CH_3$ | 6-$CH_3$ | 2'-$CH_3$ | 6'-$CH_3$ | $CH_3$ | $CH_3$ | 3 | citrate | 1 | 17.5–20 | 17.5–20 |
| J | 2-$CH_3$ | 6-$CH_3$ | 2'-$CH_3$ | 6'-$CH_3$ | $C_2H_5$ | $C_2H_5$ | 2 | HCl | 1 | 15–20 | 15–20 |
| K | Benzononatine. | | | | | | | | 1 | 12.5–15 | 12.5–15 |

From the above table it appears that more particularly the compounds having 4 orthosubstituents in the phenyl groups have a very large therapeutic range, while of these compounds (A, H and J) the 2,6,2',6'-tetramethyl-β-dimethylamino ethoxyethyl ether (A) gives the most favourable results.

A continued test showed that compounds which only differ from these according to the above general formula in that $n=1$ have no pectoral effect. It may be concluded therefrom that the presence of a polyoxyethylene group between the substituted or unsubstituted benzhydryl radical and the dialkylamino group is of essential importance for the activity of the compounds for subduing coughing stimuli.

The degree to which various compounds according to the invention influence the breath volume is represented in Table III. This table mentions the results of a comparative test of the compounds of Table II having the strongest activity. Also in this case cats were used as testing animals, which were given an intravenous injection of 1 mg./kg. of the relative substance dissolved in

TABLE I

| $R_1$ | $R_2$ | $R_3$ | $R_4$ | $R_5$ | $R_6$ | $n$ | HX | anti-acetyl choline activity | antihistaminic activity | anti-$BaCl_2$ activity |
|---|---|---|---|---|---|---|---|---|---|---|
| H | H | H | H | $CH_3$ | $CH_3$ | 2 | HCl | 0.29 | 0.01 | 1 |
| 2-$CH_3$ | 6-$CH_3$ | 2'-$CH_3$ | 6'-$CH_3$ | $CH_3$ | $CH_3$ | 2 | HCl | 0.23 | 0.03 | 4 |
| 2-$CH_3$ | 6-$CH_3$ | 2'-$CH_3$ | 6'-$CH_3$ | $C_2H_5$ | $C_2H_5$ | 2 | HCl | 0.50 | 0.02 | 5 |
| 2-$CH_3$ | 6-$CH_3$ | 2'-$CH_3$ | 6'-$CH_3$ | $CH_3$ | $CH_3$ | 3 | citrate | 1.35 | 0.04 | 4 | water. The total amount of solution was slowly injected in 10 seconds. The breath volume had been so chosen that under normal conditions it could be worked up in 55 seconds.

TABLE III

| Compound: | Period of time in seconds |
|---|---|
| A | 65 |
| H | 60 |
| J | 65 |
| Benzononatine | 125 |

It is true that in these experiments the compound H gives a slightly better result than compound A, but the total image of the activity of A is more favourable. It should further be taken into account in this connection that compound A may be synthesized with an appreciably higher yield than H.

The local anaesthetic activity of the compounds according to the invention can be clearly demonstrated by two members of the class viz. 2,6,2',6'-tetraethylbenzhydryl-β-dimethylaminoethoxyethylether and 2,6,2',6'-tetramethylbenzhydryl - β - dimethylamino(ethoxy)$_n$ethylether. The first mentioned compound, used as the fumarate salt anaesthetizes the cornea of caviae even in concentrations as low as 0.025% for an appreciable time whereas the latter used in the form of the free base exhibits an even more powerful anaesthetic action.

These examples are only given for illustrative purposes; they cannot be regarded as a limitation of the scope of the invention.

The β - dimethylaminoethoxyethylether was already known from an investigation by Riffkin and Rubin (J. Am. Pharm. Assn. 45, 317–320 (1956)) but the authors only tested it as to its possible histaminolytic activity. The preparation of this substance is not covered by the invention.

The compounds according to the invention may be prepared in the conventional manner by reacting a compound having the formula

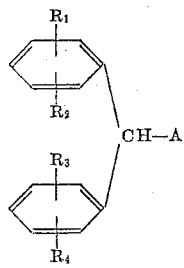

with a compound having the formula

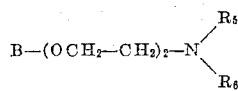

in which of both symbols A and B the one represents halogen and the other O-alkalimetal, or the symbol A halogen and the symbol B an —OH group. In the latter case an acid binding substance may be added, for which also an excess of the amino alcohol may be used.

A favourable yield with equimolecular amounts of the halogen compound and the amino alcohol may also be achieved, however, if these are heated in a polar solvent, in which case the hydrohalic acid salt is formed. This last named method is described in Dutch Patent 71,895. If desired in the synthesis described hereinbefore, a component which instead of the substituted amino group contains a halogen atom may also be used as a starting product and after carrying out the synthesis this halogen atom may in a known manner be replaced by a substituted amino group. In this case, therefore, initially a compound having the formula

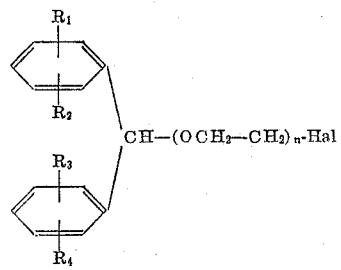

is obtained in which subsequently the halogen atom is replaced by the group

Also a variant of the above methods in which likewise in a known manner a compound having the formula

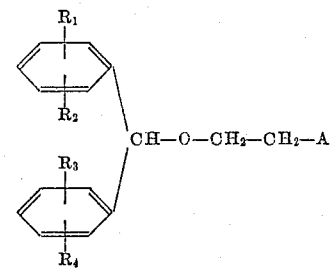

is reacted with a compound having the formula

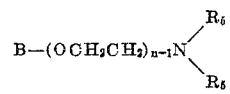

produces quite satisfactory results. In these formulae symbols A and B have the same significance as defined hereinbefore.

For the preparation of the compounds according to the invention the two following methods are preferred.

(a) Conversion of a compound having the formula

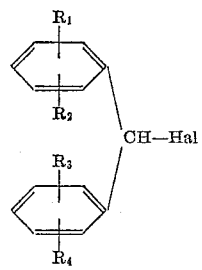

with a compound having the formula

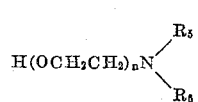

which latter compound may previously be prepared from $$H(OCH_2CH_2)_xCl$$

and

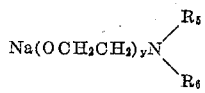

in which $x+y=n$.

(b) Conversion of a compound having the formula

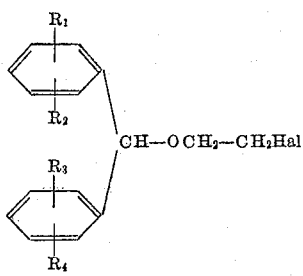

with a compound having the formula

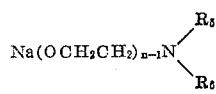

The invention will be elucidated with reference to the following examples.

Example 1

PREPARATION OF 2,6,2',6'-TETRAMETHYLBENZHYDRYL β-DIMETHYLAMINO ETHOXYETHYL ETHER.HCl 9.6 grams (0.04 mol) 2,6,2',6'-tetramethylbenzhydrol are dissolved in 50 mls. of benzene. Dry hydrochloric acid gas is introduced into the solution until it is saturated. The benzene layer is subsequently dried with anhydrous calcium-chloride and filtered, whereupon the solvent is removed by distillation.

To the resulting 2,6,2',6'-tetramethyl benzhydryl chloride 12.0 grams (0.09 mol) β-dimethylamino ethoxyethanol are added, whereupon the mixture is heated for 20 minutes at a temperature of 130–140° C. After cooling the mixture is extracted with dry ether; the ether layer is concentrated by evaporation and the remaining base (2,6,2',6'-tetramethyl benzhydryl β-dimethyl aminoethoxy ethylether) is distilled under a strongly reduced pressure. Boiling point 176–180° C./0.1 min.

The base thus obtained is dissolved in anhydrous ether and converted into the hydrochloric acid salt by the addition of a solution of hydrochloric acid gas in anhydrous ether. The salt may be purified by crystallization from a mixture of acetone and ether. Melting point 133–135° C. Yield 70%.

Example 2

PREPARATION OF THE CITRATE OF 2,6,2',6'-TETRAMETHYL BENZHYDRYL β-DIMETHYL AMINOETHOXY ETHYL ETHER

A mixture of 8 grams of tetramethyl benzhydrol and 30 mls. of chloro ethanol is heated for one hour under reflux. Upon cooling 50 mls. of water are added, whereby a precipitate is formed. This precipitate is removed by filtration, dried and recrystallized from alcohol. Yield 9 grams 2,6,2',6'-tetramethyl benzhydryl β-chloroethyl ether. Melting point 72–74° C.

Into 35 mls. dry xylene 0.7 gram (0.03 gram atom) of sodium are introduced. With stirring 5 grams of β-dimethyl aminoethoxyethanol (small excess) are added dropwise. When all sodium has been converted 9 grams (0.03 mol) 2,6,2'6'-tetramethyl benzhydryl β-chloroethyl ether dissolved in 30 mls. of xylene are added, whereupon the whole composition is heated for 6 hours under reflux. After cooling the reaction mixture is shaken with water to which 1.5 grams NaOH have been added. The xylene layer is separated and extracted with 2 N HCl. The acid water layer is after separation of the xylene layer filtered over Norit, if necessary, and made alkaline. The oil which precipitates is extracted with ether and the alkaline solution is concentrated by evaporation after drying with solid KOH. The residue is distilled under reduced pressure. Yield 3.25 grams=28%, boiling point 184–187° C./0.01 min. The free base may be converted into the citrate having a melting point of 80–82° C.

Example 3

PREPARATION OF 2,6,2',6'-TETRAMETHYL BENZHYDRYL β-DIMETHYLAMINO (ETHOXY)$_n$ ETHYLETHER.HCl, IN WHICH $n$=8–10

To 12 grams (0.05 mol) 2,6,2',6'-tetramethyl benzhydryl chloride obtained according to Example 1 are added 18.4 grams β-dimethyl amino (ethoxy)$_{n-1}$ ethanol (about 0.04 mol) and 7 grams K$_2$CO$_3$ as an acid binding substance. This amino alcohol, in which $n$ has an average value of 8–10 had previously been prepared from a polyethylene glycol having an average molecular weight of 410, by converting the monochloride thereof with the Na-derivative of dimethyl amino ethanol.

The reaction mixture is heated for half an hour at 130–140° C. After cooling the mixture is added to diluted acid, whereupon it is extracted with ether or benzene to remove non-basic constituents. After filtration, if any, and/or decolouration with active carbon the water layer is made strongly alkaline, whereby a mixture of the free bases separates; after separation of the water layer said layer is dried with solid KOH.

Table IV contains the data of a number of compounds according to the invention, it being indicated according to which method (1 and/or 2) the relative compound was prepared.

TABLE IV

| Compounds | | | | | | $n$ | HX | melting point salt | boiling point base |
|---|---|---|---|---|---|---|---|---|---|
| R$_1$ | R$_2$ | R$_3$ | R$_4$ | R$_5$ | R$_6$ | | | | |
| H | H | H | H | CH$_3$ | CH$_3$ | 2 | HCl | 128.5–129.5 | 168–174/2 |
| 2-CH$_3$ | H | H | H | CH$_3$ | CH$_3$ | 2 | HCl | 72–76 | 154–158/0.1 |
| 4-CH$_3$ | H | H | H | CH$_3$ | CH$_3$ | 2 | HCl | 129–131 | 162–166/0.01 |
| 2-CH$_3$ | CH$_3$ | H | H | CH$_3$ | CH$_3$ | 2 | HCl | 118–120 | 158–162/0.1 |
| 2-CH$_3$ | H | 2'-CH$_3$ | H | CH$_3$ | CH$_3$ | 2 | HCl | 138–140 | 152–156/0.1 |
| 2-t.C$_4$H$_9$ | H | H | H | CH$_3$ | CH$_3$ | 2 | HCl | 147–148 | 206–210/1 |
| 4-CH$_3$ | H | 4'-CH$_3$ | H | CH$_3$ | CH$_3$ | 2 | HCl | 140–141 | 146–149/0.001 |
| 2-CH$_3$ | 6-CH$_3$ | 2'-CH$_3$ | 6'-CH$_3$ | CH$_3$ | CH$_3$ | 2 | HCl | 133–135 | 176–180/0.1 |
| 2-CH$_3$ | 6-CH$_3$ | 2'-CH$_3$ | 6'-CH$_3$ | C$_2$H$_5$ | C$_2$H$_5$ | 2 | HCl | 132–133 | 187–190/0.01 |
| 2-C$_2$H$_5$ | 6-C$_2$H$_5$ | 2'-C$_2$H$_5$ | 6'-C$_2$H$_5$ | CH$_3$ | CH$_3$ | 2 | — | — | 170/0.01 |
| 2-CH$_3$ | 6-CH$_3$ | 2'-CH$_3$ | 6'-CH$_3$ | CH$_3$ | CH$_3$ | 3 | citrate | 80–82 | 184–187/0.01 |

I claim:
The hydrochloride of the compound having the formula
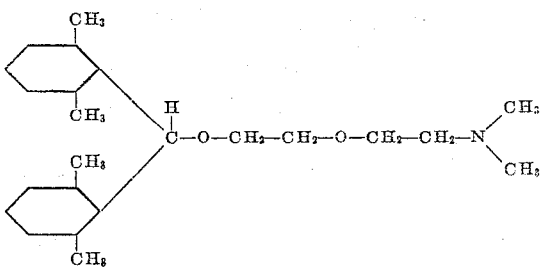
References Cited in the file of this patent
UNITED STATES PATENTS
2,532,292 Cusic _____ Dec. 5, 1950
2,567,351 Rieveschl _____ Sept. 11, 1951
FOREIGN PATENTS
955,595 Germany _____ Jan. 3, 1957
OTHER REFERENCES
Riffkin: J. Amer. Pharm. Assn., vol. 45 (1956), pp. 317–20. (Copy in Sci. Library, U.S. Patent Office, Washington 25, D.C.)